United States Patent
Kunimoto

(10) Patent No.: US 10,635,440 B2
(45) Date of Patent: Apr. 28, 2020

(54) WORKFLOW GENERATING APPARATUS DISPLAYING OUTPUT DATA OF JOB TO BE ADDED TO WORKFLOW, AND COMPUTER READABLE STORAGE MEDIUM STORING PROGRAM INSTRUCTIONS FOR CAUSING WORKFLOW GENERATING APPARATUS TO DISPLAY THE OUTPUT DATA

(71) Applicant: Brother Kogyo Kabushiki Kaisha, Nagoya (JP)

(72) Inventor: Shintaro Kunimoto, Nagoya (JP)

(73) Assignee: Brother Kogyo Kabushiki Kaisha, Nagoya-Shi (JP)

(*) Notice: Subject to any disclaimer, the term of this patent is extended or adjusted under 35 U.S.C. 154(b) by 0 days.

(21) Appl. No.: 16/144,066

(22) Filed: Sep. 27, 2018

(65) Prior Publication Data
US 2019/0102189 A1    Apr. 4, 2019

(30) Foreign Application Priority Data
Sep. 29, 2017  (JP) .................... 2017-191606

(51) Int. Cl.
| | |
|---|---|
| G06F 9/30 | (2018.01) |
| G06F 9/48 | (2006.01) |
| H04N 1/04 | (2006.01) |
| G06F 3/12 | (2006.01) |
| H04N 1/00 | (2006.01) |

(52) U.S. Cl.
CPC ........ *G06F 9/30058* (2013.01); *G06F 3/1204* (2013.01); *G06F 3/1237* (2013.01); *G06F 9/4806* (2013.01); *H04N 1/00411* (2013.01); *H04N 1/04* (2013.01)

(58) Field of Classification Search
CPC ..................................... G06F 9/4806
See application file for complete search history.

(56) References Cited

U.S. PATENT DOCUMENTS

2009/0316977 A1* 12/2009 Juncker ............... G06Q 40/12
                                                        382/133
2018/0053328 A1*  2/2018 Simonovic ............ G06T 11/206

FOREIGN PATENT DOCUMENTS

JP        2006-197409 A      7/2006

OTHER PUBLICATIONS

Workflow Systems for Science: Concepts and Tools, ISRN Software Engineering, 2013 (Year: 2013).*

* cited by examiner

*Primary Examiner* — Charlie Sun
(74) *Attorney, Agent, or Firm* — Burr & Brown, PLLC

(57) ABSTRACT

A non-transitory computer readable storage medium stores a set of program instructions for a workflow generating apparatus including a processor and a display. The workflow generating apparatus is capable of generating a workflow by combining a plurality of jobs. The set of program instructions, when executed by the processor, causes the workflow generating apparatus to perform: receiving a selection of one job to be added to the workflow from among a plurality of selectable jobs; acquiring input data to be inputted to the one job; specifying, on the basis of the acquired input data, output data to be outputted by execution of the one job, the output data being usable as input data for a job to be executed after execution of the one job in the workflow; and displaying, on the display, the specified output data in a distinguishable manner.

12 Claims, 8 Drawing Sheets

WORKFLOW GENERATING APPARATUS DISPLAYING OUTPUT DATA OF JOB TO BE ADDED TO WORKFLOW, AND COMPUTER READABLE STORAGE MEDIUM STORING PROGRAM INSTRUCTIONS FOR CAUSING WORKFLOW GENERATING APPARATUS TO DISPLAY THE OUTPUT DATA

CROSS REFERENCE TO RELATED APPLICATION

This application claims priority from Japanese Patent Application No. 2017-191606 filed Sep. 29, 2017. The entire content of the priority application is incorporated herein by reference.

TECHNICAL FIELD

The present disclosure relates to a workflow generating apparatus, a method for generating a workflow, a non-transitory computer readable storage medium storing a set of program instructions for the workflow generating apparatus.

BACKGROUND

There has been known a configuration that generates a workflow by combining a plurality of selected functions (jobs) and executes the plurality of jobs according to the generated workflow. Japanese Patent Application Publication No. 2006-197409 discloses a configuration that allows a multifunction peripheral capable of executing various jobs (such as a print job and a scan job) to execute a plurality of jobs according to a workflow generated by a personal computer.

In this configuration, a workflow generation screen is displayed during generation of a workflow. The workflow generation screen displays a list of a plurality of jobs that can be added to the workflow and connection restriction information indicating restrictions in connection between the jobs.

Specifically, the connection restriction information indicating whether or not the job is a job for which a connection with both of an input destination job and an output destination job is essential, whether or not the job is a job for which a connection with an input destination job is optional, or the like is displayed together with a list of a plurality of jobs that can be added to the workflow. The connection restriction information is set in advance for each job.

SUMMARY

In the configuration disclosed in the Publication '409, a user refers to the connection restriction information of each job to select a job that can be added to the workflow. However, even in a case where a job is determined to be addable to the workflow on the basis of the connection restriction information, execution of the job may fail when the job is added to the workflow.

That is, for example, when essential input data of the job includes data of a specific data type, execution of the job may fail unless the specific type data is outputted from a job to be executed before the job in the workflow.

In view of the foregoing, it is an object of the disclosure to provide a technique allowing a user to easily determine whether or not a job whose essential input data includes data of a specific data type can be added to the workflow.

In order to attain the above and other objects, according to one aspect, the disclosure provides a non-transitory computer readable storage medium storing a set of program instructions for a workflow generating apparatus including a processor and a display. The workflow generating apparatus is capable of generating a workflow by combining a plurality of jobs. The set of program instructions, when executed by the processor, causing the workflow generating apparatus to perform: receiving a selection of one job to be added to the workflow from among a plurality of selectable jobs; acquiring input data to be inputted to the one job; specifying, on the basis of the acquired input data, output data to be outputted by execution of the one job, the output data being usable as input data for a job to be executed after execution of the one job in the workflow; and displaying, on the display, the specified output data in a distinguishable manner.

According to another aspect, the disclosure provides a workflow generating apparatus capable of generating a workflow by combining a plurality of jobs. the workflow generating apparatus includes a display and a processor. The processor is configured to perform: receiving a selection of one job to be added to the workflow from among a plurality of selectable jobs; acquiring input data to be inputted to the one job; specifying, on the basis of the acquired input data, output data to be outputted by execution of the one job, the output data being usable as input data for a job to be executed after execution of the one job in the workflow; and displaying, on the display, the specified output data in a distinguishable manner.

According to still another aspect, the disclosure provides a method for generating a workflow by combining a plurality of jobs. The method includes: receiving a selection of one job to be added to the workflow from among a plurality of selectable jobs; acquiring input data to be inputted to the one job; specifying, on the basis of the acquired input data, output data to be outputted by execution of the one job, the output data being usable as input data for a job to be executed after execution of the one job in the workflow; and displaying, on the display, the specified output data in a distinguishable manner.

BRIEF DESCRIPTION OF THE DRAWINGS

The particular features and advantages of the disclosure will become apparent from the following description taken in connection with the accompanying drawings, in which.

DETAILED DESCRIPTION

Hereinafter, an embodiment of the present disclosure will be described while referring to the accompanying drawings.

1. Configuration

Figure 1:
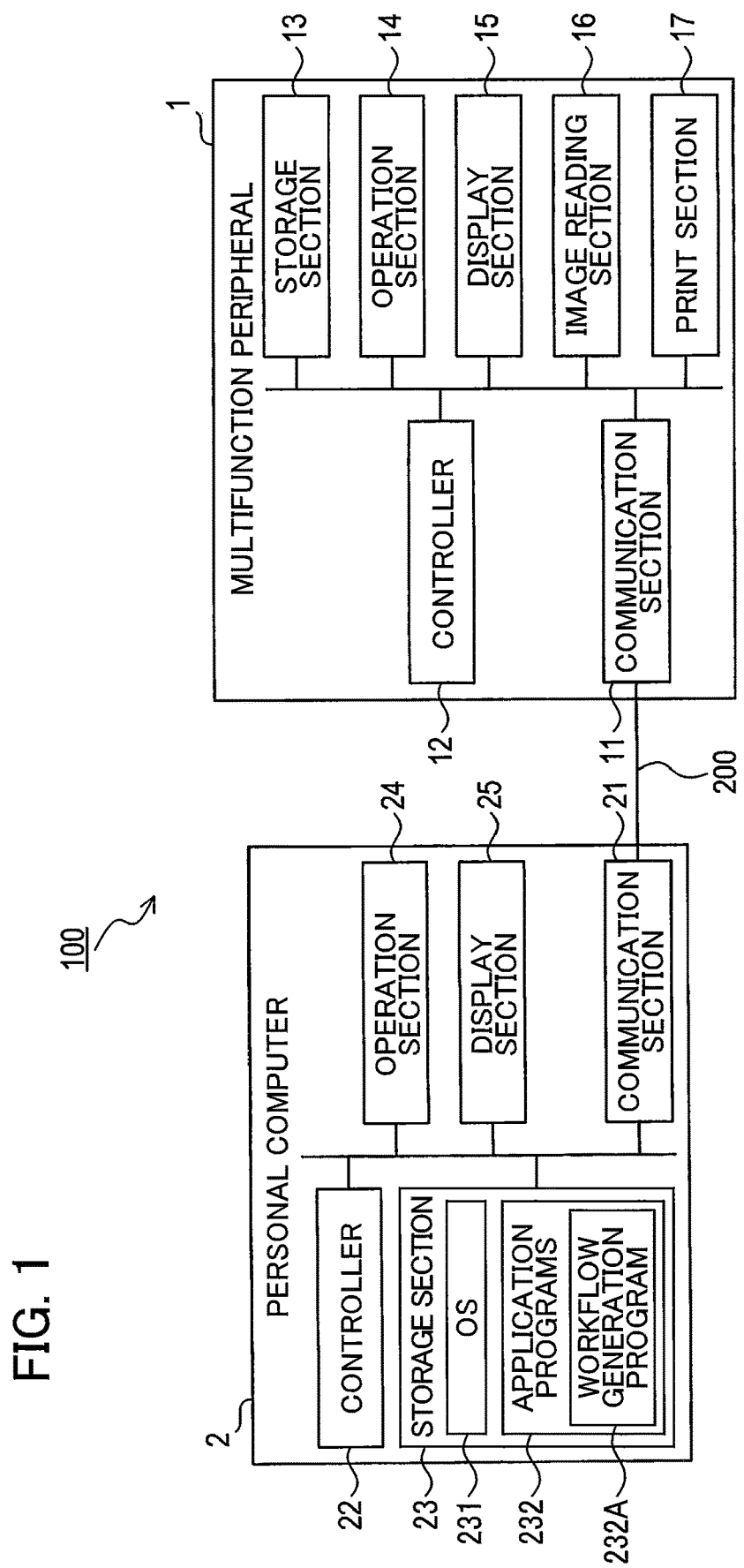
FIG. 1 is a block diagram illustrating a configuration of a workflow generating system according to an embodiment of the present disclosure.

A workflow generating system 100 illustrated in FIG. 1 includes a multifunction peripheral 1 and a personal computer 2. The multifunction peripheral 1 and the personal computer 2 can perform data communication with each other via a Local Area Network 200. Hereinafter, the multifunction peripheral 1, the personal computer 2, and the Local Area Network 200 will be simply referred to as "MFP 1", "PC 2", and "LAN 200", respectively.

The MFP 1 possesses a plurality of functions (jobs). Specifically, the MFP 1 has jobs such as a print job, a scan job and an OCR (Optical Character Recognition) job. The print job is a job that executes printing of electronic files. The scan job is a job that executes scanning of original documents. The OCR job is a job that executes an OCR process on image data. The OCR process is a process of recognizing text from image data and converting the recognized text into digital data (text data).

The MFP 1 has a communication unit 11, a controller 12, a storage unit 13, an operation unit 14, a display unit 15, an image reading unit 16, and a printing unit 17. The communication unit 11 is a communication interface for connecting the MFP 1 to the LAN 200.

The controller 12 totally controls respective parts of the MFP 1 and has a CPU, for example. The storage unit 13 has a semiconductor memory such as a RAM, a ROM, and a flash memory.

The controller 12 performs various functions by executing programs stored in a non-transitory tangible computer-readable storage medium. In the present embodiment, the storage unit 13 corresponds the non-transitory computer readable storage medium that stores the programs. When the controller 12 receives an instruction to execute a job from the PC 2 via the communication unit 11, the controller 12 executes the job.

The operation unit 14 is an input device that receives user's input operations. For example, the operation unit 14 includes an operation button and a touch panel. The display unit 15 includes a display (e.g., a liquid crystal display) as a display device that can display information.

The image reading unit 16 is a scanner for performing the scan job. The image reading unit 16 has an image sensor. The image reading unit 16 reads an image of an original document using the image sensor and generates image data representing the image.

The print unit 17 is a printer for performing the print job. The print unit 17 has a function of printing various image data onto various types of printing media.

The PC 2 has a communication unit 21, a controller 22, a storage unit 23, an operation unit 24, and a display unit 25. The PC 2 is an example of the claimed "workflow generating apparatus".

The communication unit 21 is a communication interface for connecting the PC 2 to the LAN 200. The controller 22 totally controls respective parts of the PC 2 and has a CPU, for example. The storage unit 23 has a semiconductor memory such as a RAM, a ROM, and a flash memory.

The controller 22 performs various functions by executing programs stored in a non-transitory tangible computer-readable storage medium. The storage unit 23 is an example of the claimed "non-transitory computer-readable storage medium". The controller 22 is an example of the claimed "processor".

The storage unit 23 stores an operating system 231, various application programs 232, and the like. In the present embodiment, the application programs 232 include a workflow generation program 232A. The workflow generation program 232A is an example of the claimed "set of program instructions".

The controller 22 is configured to perform a workflow generation process (described later) illustrated in FIG. 2 by executing the workflow generation program 232A. In other words, the workflow generation program 232A, when executed by the controller 22, causes the PC 2 to perform the workflow generation process. The workflow generation process is a process of generating a workflow by combining a plurality of jobs selected by a user. When the workflow generation program 232A is executed, an addition determination process illustrated in FIG. 3 and a job-deletion process illustrated in FIG. 4 are executed as a part of the workflow generation process.

The operation unit 24 is an input interface that receives user's input operations. For example, the operation unit 24 includes a key board and various pointing devices. The display unit 25 has a display (e.g., a liquid crystal display) as a display device that can display information. The display of the display unit 25 is an example of the claimed "display".

2. Various Jobs

The following describes jobs that can be added to (i.e., incorporated into) the workflow, i.e., jobs that can be selected by a user in the present embodiment. Each of the selectable jobs has zero or more essential input items and zero or more standard output items. Further, each of the selectable jobs has zero or more optional input items and zero or more optional output items. The essential input items is not only an example of the claimed "input data" but also an example of the claimed "essential input data".

The optional input item is an item additionally inputted according to the setting of the user besides the essential input item. The optional output item is an item additionally outputted according to the setting of the user besides the standard output item. Hereinafter, each of the essential input items and the optional input items is sometimes simply referred to as "input item" without distinguishing therebetween. Further, hereinafter, each of the standard output items and the optional output items is sometimes simply referred to as "output item" without distinguishing therebetween. The optional input item is an example of the claimed "input data". The optional output item is an example of the claimed "output data".

The input items can be inputted by at least one of user-input and variable-use. The user-input is an input method in which a user inputs an input item through the operation unit 24. The variable-use is an input method in which an input item for a job is inputted by inputting the value of a variable outputted in a program of a preceding job executed before execution of the job in the same workflow to a variable used in a program of the job.

Of the variables used in a program of each job, the variables whose value is used as the input item for another job in the same workflow are managed as global variables in the workflow. That is, the variables used in a program of each job include a global variable that can be used also in a program of another job executed after execution of the job in the workflow.

In the present embodiment, the plurality of jobs that can be selected by a user include a scan job, an OCR job, an email job, a print job, a separating job, and a branch job.

<Scan Job>

The essential input items for the scan job are various setting items concerning image scan. Specifically, the essential input items of the scan job include a setting item for setting which of single-side scan (scanning only one side of each original document) and double-side scan (scanning both sides of each original document) is executed. Further, the essential input items of the scan job further include: a setting item for setting which of color scan and monochrome scan is executed; and a setting item for setting the number of original documents to be scanned. The number of original documents to be scanned can be set to a specific value (e.g., two, three, or the like) or can also be set to "automatic". When the number of original documents to be scanned is set to "automatic", all of the original documents set on a document table are scanned. The above setting items are inputted by the user-input.

The optional input item of the scan job is a file path or an URL indicating a save destination of image data of a scanned image. The file path or URL is string type data (i.e., data of the string data type) and is received by a string type variable (i.e., a variable having the string data type). The save destination is inputted by the user-input.

The standard output items of the scan job is image data of a scanned image. The optional output items of the scan job is the file size of image data of a scanned image. The file size is integer type data (i.e., data of the integer data type) and is outputted by an integer type variable (i.e., a variable having the integer data type).

<OCR Job>

The essential input item of the OCR job is image data. The image data is inputted by the variable-use.

The optional input item of the OCR job is a setting item for setting a conversion area in image data inputted to the OCR job. The conversion area is an area to be converted into text data. This setting item is inputted by the user-input.

The standard output item of the OCR job is text data obtained through conversion of image data. The text data is string type data and is received by a string type variable. The optional output item of the OCR job is a numeral included in the text data. That is, in a case where the above optional output item is set, when a numeral is included in the text data obtained through the OCR process, this numeral is outputted. The numeral is integer type data and is received by an integer type variable.

<Email Job>

The email job is a job that transmits an email from the PC 2.

The essential input item of the email job is the mail address of a transmission destination. The email address is string type data and is received by a string type variable. The email address is inputted by the user-input.

The optional input items of the email job include the subject of an email, image data attached to the email, an attachment size condition, the storage location of a file attached to the email, and the like. The attachment size condition is a condition concerning data sizes of attached files. Each of the above input items of the email job is inputted not only by the user-input but also by the variable-use. The email subject is string type data and is received by a string type variable, the attachment size condition is integer type data and is received by an integer type variable, and the storage location of the attached file is string type data and is received by a string type variable.

The email job has no standard output item. The optional output item of the email job is a default dialogue indicating a transmission result. For example, this dialogue includes a message "Mail has been transmitted to the mail address ad1".

<Print Job>

The essential input item of the print job is a file path or an URL indicating the storage location of an electronic file to be printed. The file path or URL is string type data and is inputted not only by the user-input but also by the variable-use.

The optional input items of the print job include various setting items concerning printing. Specifically, the optional input items of the print job include a setting item for designating monochrome print or color print. The value of this setting item is inputted by the user-input. That is, a user designates, through the user-input, whether monochrome print or color print is performed.

The print job has no standard output item. As a result of execution of the print job, a physical print medium is outputted. The optional output items of the print job include image data of a printed image and the file size of the image data. The optional output items of the print job further include a setting item for setting whether or not to output the file path (or the URL) indicating the storage location of an electronic file to be printed. The file size is integer type data and is received by an integer type variable. The file path or URL indicating the storage location is string type data and is received by a string type variable.

<Separating Job>

The separating job is a job that divides an output variable outputted from a preceding job (i.e., a job executed before execution of the separating job in a workflow) into a plurality of constituent elements and executes subsequent jobs (i.e., jobs to be executed after the execution of the separating job in the workflow) for each of the constituent elements. The output variable denotes a variable outputted (generated) through execution of each job. The separating job is an example of the claimed "first job".

The essential input items of the separating job include a variable to be divided and a division unit designating the unit of division. These input items are inputted by the user-input. The division unit is integer type data and is received by an integer type variable.

The standard output item of the separating job is a plurality of divided variables (i.e., a plurality of variables obtained by dividing a variable). The separating job has no optional input item and no optional output item. A specific example in which the separating job is used will be described later.

<Branch Job>

The branch job is a job that causes a processing path, which is constituted by a combination of a plurality of jobs added to a workflow, to branch according to a set condition. The branch job is an example of the claimed "second job".

The essential input items of the branch job includes a variable, a conditional expression ("=", "≥", "≤", etc.), and a determination value which is a set value set. That is, on the basis of whether or not a value inputted to a variable satisfies a condition specified by the conditional expression in relation with the determination value, the branch job causes the processing path to branch.

The branch job has no optional input item, no standard output item, and no optional output item. A specific example in which the branch job is used will be described later.

3. Process

Next, a workflow generation process executed by the controller 22 of the PC 2 will be described while referring to the flow chart depicted in FIG. 2. The workflow generation process is started by the workflow generation program 232A stored in the storage unit 23 being executed by the controller 22.

Figure 5:
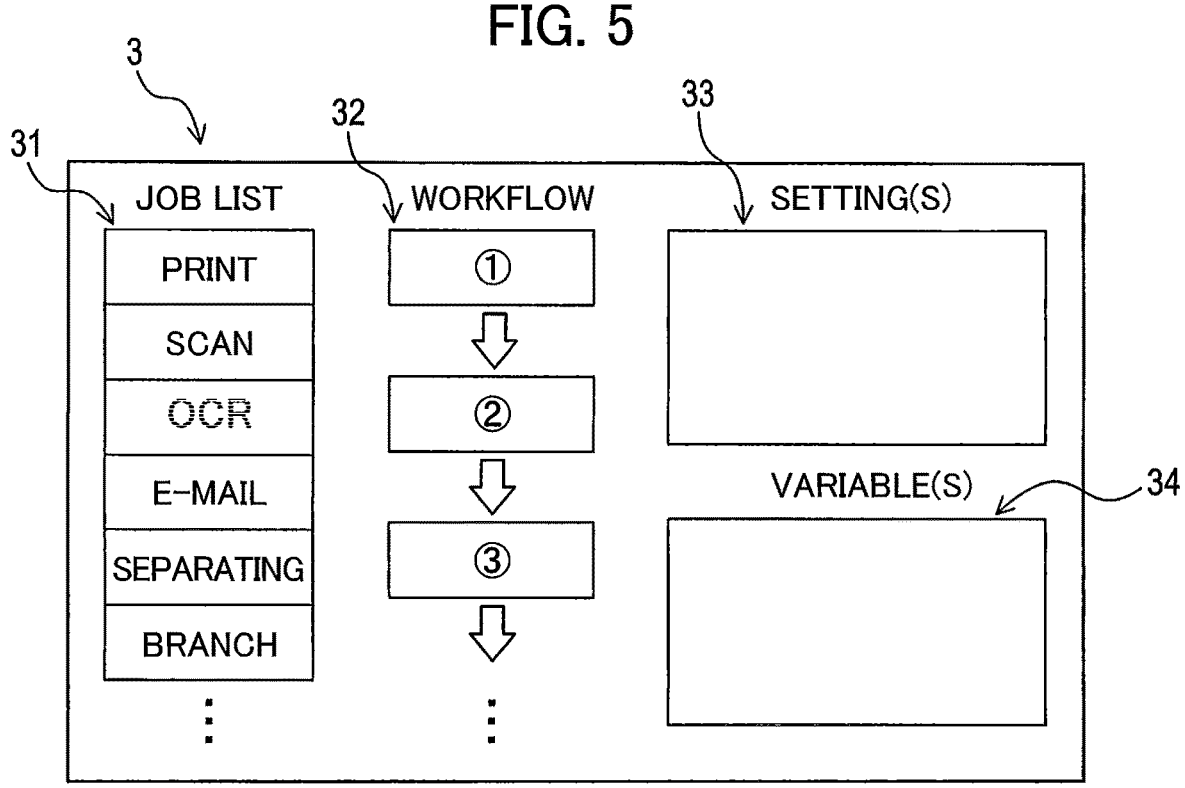
FIG. 5 is a first view illustrating a workflow generation screen displayed during the workflow generation process.

In S101, the controller 22 displays a workflow generation screen 3 illustrated in FIG. 5 on the display unit 25. The workflow generation screen 3 includes a job list display part 31, a workflow display part 32, a setting display part 33, and a variable display part 34.

On the job list display part 31, a plurality of jobs that can be selected by a user are displayed. The user selects a job from among the plurality of jobs displayed on the job list display part 31, whereby the selected job is added to (i.e., incorporated into) a workflow. Note that each of the plurality of selectable jobs can use, when the selectable job is added to the workflow, output variables of each preceding job to be executed before execution of the selectable job in the workflow as input item of the selectable job. The plurality of jobs displayed on the job list display part 31 is an example of the claimed "plurality of selectable jobs".

In the present embodiment, at the start of the workflow generation process, the OCR job cannot be selected on the job list display part 31 in the workflow generation screen 3. That is, the OCR job cannot be added to a workflow as a job to be first executed in the workflow. This is because, in a case in which the OCR job is added to a workflow as a job to be first executed in the workflow, the OCR job fails to be executed since image data that is the essential input item for the OCR job is not outputted before execution of the OCR job (i.e., the essential input item for the OCR job is absent in the workflow at a time when the OCR job is about to be executed).

In the present embodiment, of the jobs that are displayed on the job list display part 31, one or more jobs that can be added to the workflow and the remaining one or more jobs that cannot be added are distinguishably displayed on the job list display part 31. In other words, of the jobs displayed on the job list display part 31, one or more jobs that can be added to the workflow are displayed in a distinguishable manner from the remaining one or more jobs that cannot be added to the workflow. Specifically, the remaining one or more jobs that cannot be added are displayed in a gray-out state.

On the workflow display part 32, a workflow being generated (i.e., a workflow in the middle of being generated) or a generated workflow is displayed. In the example of FIG. 5, each time a user selects a job, the selected job is displayed on the workflow display part 32 from the top thereof in the selection order.

On the setting display part 33, setting contents set by the user for a job to be added to the workflow are displayed.

On the variable display part 34, the output variable to be outputted from the job added to the workflow are displayed. The output variable denotes a variable that can be used as an input item for a job to be executed, in the workflow, after execution of a preceding job from which the variable is outputted. In the present embodiment, at least one of the data type and value of each of the output variable(s) to be outputted from a job added to the workflow is displayed on the variable display part 34. Further, on the variable display part 34, at least one of the data type and value of each of the output variable(s) to be outputted from each of all the jobs included in the workflow is displayed. The output variable is an example of the claimed "output data".

In S102, the controller 22 determines whether or not to end the workflow generation process. In the present embodiment, a non-illustrated button for terminating the workflow generation process is displayed on the workflow generation screen 3. On the basis of the status of user's operation to this button, the controller 22 determines whether or not to end the workflow generation process.

Figure 2:
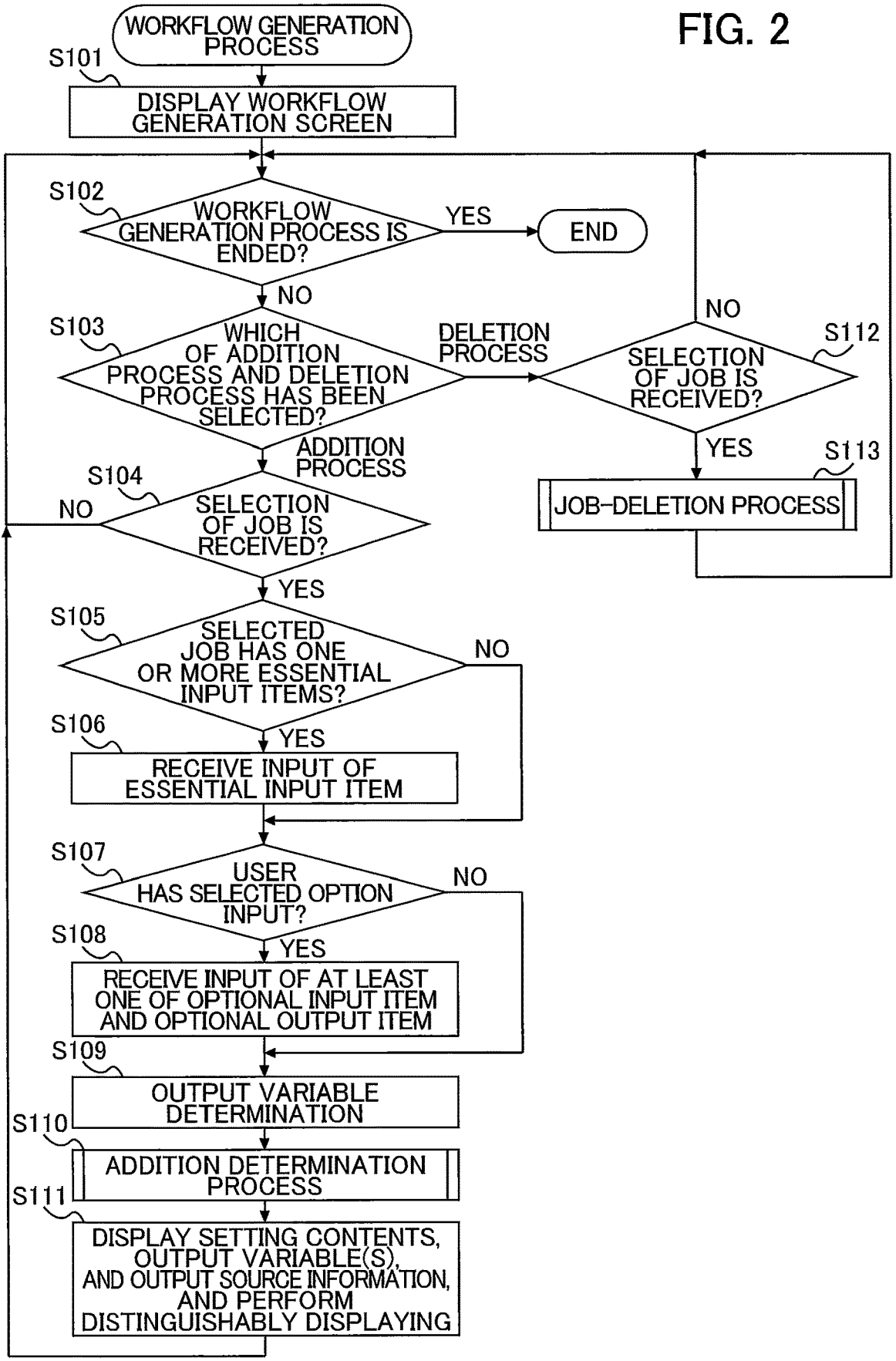
FIG. 2 is a flowchart illustrating a workflow generation process performed by a control unit of a personal computer of the workflow generating system according to the embodiment.

When determining to end the workflow generation process in S102, the controller 22 ends the workflow generation process of FIG. 2.

On the other hand, when determining not to end the workflow generation process in S102, the controller 22 determines in S103 which one of an addition process to add a job and a deletion process to delete a job has been selected.

In the present embodiment, a non-illustrated button for switching between the addition process and the deletion process is displayed on the workflow generation screen 3. On the basis of the status of user's operation to this button, the controller 22 determines which one of the addition process and deletion process has been selected by the user.

In a case where the deletion process has been selected, when the user selects a job displayed on the workflow display part 32, the selected job is deleted from the workflow.

When determining in S103 that the addition process has been selected, the controller 22 advances to S104 and determines whether or not selection of a job to be added to the workflow has been received from the user. When determining that the selection has not been received, the controller 22 returns to S102.

On the other hand, when determining that the selection has been received from the user, the controller 22 proceeds to S105 and determines whether or not the selected job has one or more essential input items.

When determining in S105 that the selected job has one or more essential input items, the controller 22 proceeds to S106. In S106, the controller 22 receives input of the one or more essential input items. In other words, in S106, the controller 22 acquires the one or more essential input items to be inputted to the selected job. As a result, a value of each of the one or more essential input items is inputted to a corresponding one of variables for receiving the one or more essential input items. After executing step S106, the controller 22 proceeds to step S107.

On the other hand, when determining in S105 that the selected job has no essential input item, the controller 22 skips step S106 and proceeds to S107.

Subsequently, in S107, the controller 22 determines whether or not the user has selected an option input.

When determining that the user has selected the option input, the controller 22 proceeds to S108. In S108, the controller 22 receives input of at least one of: one or more optional input items; and one or more optional output items. In other words, in S108, the controller 22 acquires at least one of: one or more optional input items to be inputted to the selected job; and one or more optional output items to be inputted to the selected job.

In a case where the controller 22 receives input of the one or more optional input item, a value of each of the one or more optional input items is inputted to a corresponding one of variables for receiving the one or more optional input items.

In a case where the controller 22 receives input of the one or more optional output items, a value of each of the one or more optional output items is inputted to a corresponding one of variables for receiving the one or more optional output items.

In a case where the controller 22 receives not only input of the one or more optional input items but also input of the one or more optional output items, the value of each of the one or more optional input items is inputted to the corresponding one of the variables for receiving the one or more optional input items and the value of each of the one or more optional output items is inputted to the corresponding one of the variables for receiving the one or more optional output items. After executing S108, the controller 22 proceeds to S109.

On the other hand, when determining in S107 that the user has not selected the option input, the controller 22 skips S108 and proceeds to S109.

In S109, the controller 22 executes an output variable determination. Specifically, on the basis of the job selected in S104 and input data inputted to the job in at least one of S106 and S108 (i.e., a value of each of the one or more variables inputted to the job in at least one of S106 and S108), the controller 22 specifies one or more output variables to be outputted by execution of the job selected in S104. In the present embodiment, both the type and value of the output variable are specified.

In S110, the controller 22 executes the addition determination process on the basis of the job selected in S104 and the output variable(s) to be outputted in the workflow. The addition determination process is executed for each of the plurality of jobs displayed on the job list display part 31. In other words, the addition determination process is executed for each of the plurality of selectable jobs. In the addition determination process, the controller 22 determines whether or not a job subject to determination can be added, subsequently to the job selected in S104, to the workflow in the middle of being generated. A detailed description of the addition determination process will be made later while referring to FIG. 3.

Subsequently, in S111, the controller 22 displays various data on the display unit 25. Specifically, the controller 22 displays the job selected in S104 on the workflow display part 32. Further, of the input data inputted in at least one of step 106 and S108, the controller 22 displays on the setting display part 33 the setting contents set by the user. Further, the controller 22 displays, on the variable display part 34, the output variable(s) specified in S109 (i.e., the output variable(s) of the job selected in S104). Furthermore, the controller 22 displays output source information on the variable display part 34. The output source information 41 indicates from which job each of the output variable(s) displayed on the variable display part 34 is to be outputted. Details of the output source information 41 will be described later.

Further, of the plurality of jobs displayed on the job list display part 31, one or more jobs determined, in the addition determination process of S110, to be addable to the workflow are displayed by the controller 22 in a distinguishable manner from the remaining one or more jobs determined not to be addable. Specifically, the remaining one or more jobs determined not to be addable are displayed in a gray-out state. A specific example of the execution results of S111 will be described later while referring to FIGS. 6 to 12.

After executing S111, the controller 22 returns to S102. In this way, by repetition of the processes from S103 to S111, the controller 22 receives selections of jobs from the user one after another. Every time the controller 22 receives the selection, the controller 22 additionally displays at least one of the data type and value of the output variable(s) of the selected job to the variable display part 34.

On the other hand, when determining in S103 that the deletion process has been selected, the controller 22 proceeds to S112.

In S112, the controller 22 determines whether or not selection of a job to be deleted from among the job(s) included in (i.e., already added to) the workflow has been received from the user. When determining that the selection has not been received, the controller 22 returns to S102.

On the other hand, when determining that the selection has been received, the controller 22 proceeds to S113 and executes the job-deletion process. In the job-deletion process, of the job(s) to be executed after execution of the selected job in the workflow, a job that uses as the essential input item(s) thereof the output variable(s) of the selected job is also deleted together with the selected job. A detailed description of the job-deletion process will be made later while referring to FIG. 4.

<Addition Determination Process>

Next, the addition determination process executed in S110 by the controller 22 will be described while referring to the flowchart depicted in FIG. 3. Hereinafter, a job specified, from among the plurality of jobs displayed on the job list display part 31, as a job subject to determination in the addition determination process is referred to as "target job".

In S201, the controller 22 determines whether or not the target job has one or more essential input items. When determining that the target job has one or more essential input items, the controller 22 proceeds to S202.

In S202, the controller 22 determines whether or not a specific variable is included in the one or more essential input items of the target job. In other words, in S202, the controller 22 determines whether or not a specific essential input item is included in the one or more essential input items of the target job.

The specific variable denotes a variable to which a value can be inputted only by the variable-use. Further, the specific essential input item denotes an essential input item received by the specific variable. Note that, hereinafter, the data type of the specific variable will be referred to as "specific data type". The specific variable is an example of the claimed "specific input data". Also, the specific essential input item is an example of the claimed "specific input data".

That is, even in a case where a variable having the specific data type (i.e., a variable having the same data type as that of the specific variable) is included in the one or more essential input items of the target job, when a value can be inputted to the variable by the user-input, the controller 22 determines in S202 that a specific variable is not included in the one or more essential input items of the target job.

When determining in S202 that the specific variable is included in the one or more essential input items of the target job, the controller 22 proceeds to S203.

In S203, the controller 22 determines whether or not a specific type variable is to be outputted in the workflow in the middle of being generated. The specific type variable denotes a variable having the specific data type, i.e., a variable having the same data type as that of the specific variable. The specific type variable is an example of the claimed "specific type output data".

In other words, in S203, the controller 22 determines whether or not a variable having the same data type as that of the specific variable included in the one or more essential input items of the target job is included in the output variable(s) of the job(s) included in the workflow in the middle of being generated.

In this way, it is determined in S203 whether or not, when the target job is added to the workflow, a specific type variable (i.e., a variable having the same data type as that of the specific variable included in the one or more essential input items of the target job) is to be outputted, by execution of the job(s) to be executed before execution of the target job in the workflow, so as to be usable for a corresponding one of the one or more essential input items of the target job.

When determining in S203 that the specific type variable is to be outputted in the workflow in the middle of being generated, the controller 22 proceeds to S204.

Note that, also when determining in S202 that the specific variable is not included in the one or more essential input items of the target job, the controller 22 proceeds to S204. Further, also when determining in S201 that the target job has no essential input item, the controller 22 proceeds to S204.

Figure 3:
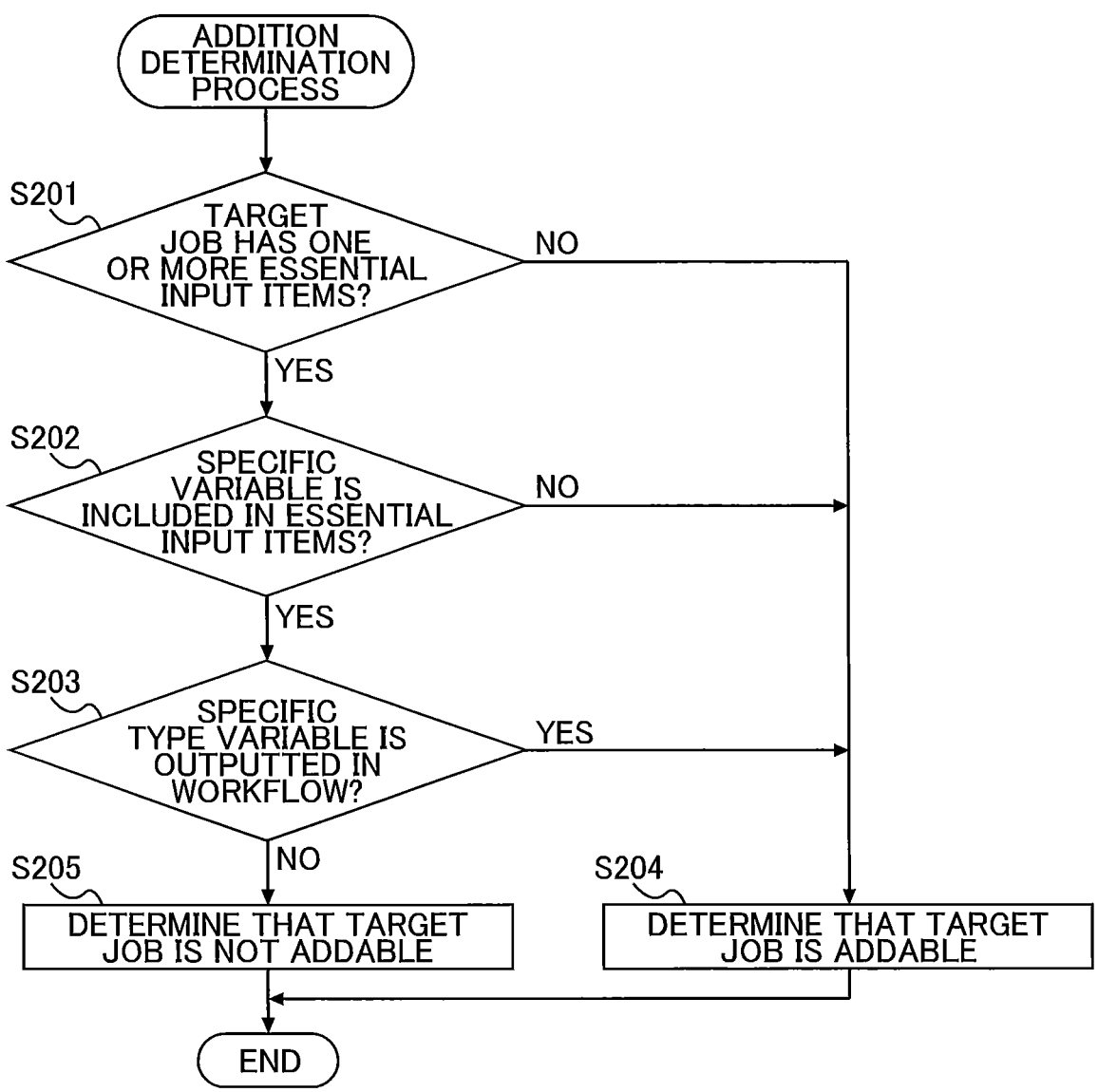
FIG. 3 is a flowchart of an addition determination process performed in the workflow generation process.
Figure 4:
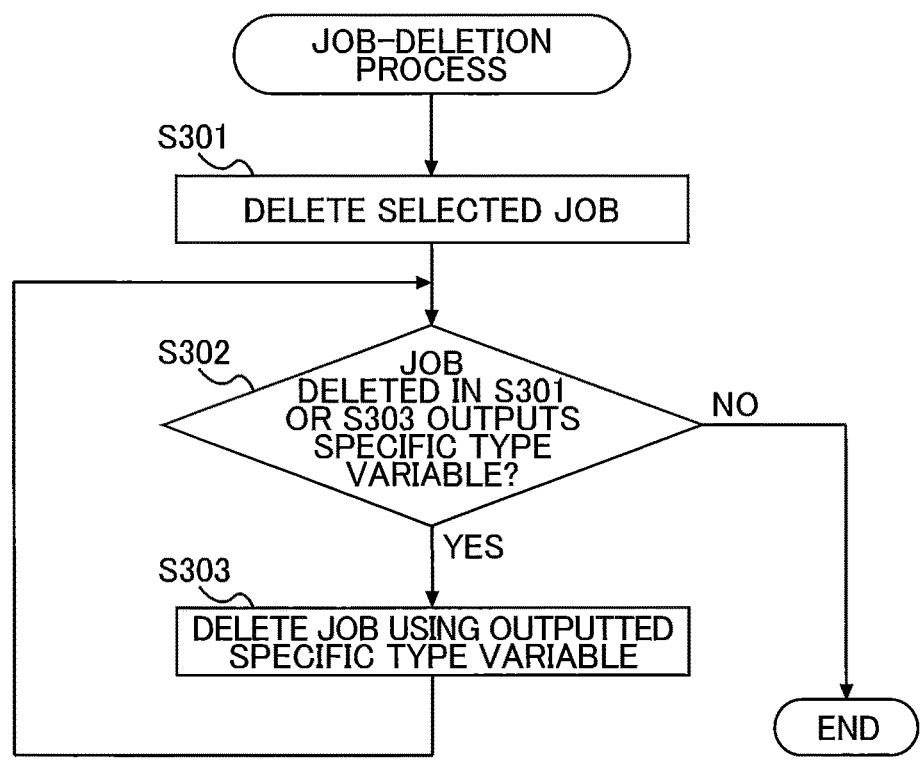
FIG. 4 is a flowchart of a job-deletion process performed in the workflow generation process.

In S204, the controller 22 determines that the target job can be added to the workflow and ends the addition determination process of FIG. 3.

On the other hand, when determining in S203 that the specific type variable is not to be outputted in the workflow in the middle of being generated, the controller 22 proceeds to S205 and determines that the target job cannot be added to the workflow and ends the addition determination process of FIG. 3.

<Job-Deletion Process>

The job-deletion process executed in S113 by the controller 22 will be described while referring to the flowchart depicted in FIG. 4.

In S301, the controller 22 deletes the job selected in S112 of FIG. 2 from the workflow.

Subsequently, in S302, the controller 22 determines, based on a determination result of the output variable determination executed in S109 of FIG. 2, whether or not the job deleted in S301 outputs the specific type variable.

When determining in S302 that the job deleted in S301 outputs the specific type variable, the controller 22 proceeds to S303.

In S303, the controller 22 also deletes from the workflow a job that uses, as the essential input item thereof, the specific type variable outputted by the job deleted in S301. That is, the controller 22 deletes, from among the jobs to be executed after execution of the job deleted in S301 in the workflow, a job that uses, as the essential input item thereof, the specific type variable outputted by the job deleted in S301.

After executing S303, the controller 22 returns to S302 and executes the process of S302 and/or S303 for the job deleted in S303.

On the other hand, when determining in S302 that the deleted job does not output the specific type variable, the controller 22 ends the job-deletion process of FIG. 4. That is, the controller 22 sequentially deletes: the job (first deleted job) selected in S112 of FIG. 2; the job (second deleted job) that uses as the essential input item thereof the output variable of the selected job (first deleted job); and the job (third deleted job) that uses as the essential input item thereof the output variable of the job (second deleted job). In this manner, the controller 22 continues deletion of the job until the controller 22 determines in S302 that the deleted job does not output the specific type variable. The job that uses as the essential input item thereof the specific type variable outputted by the job deleted in one of S301 and S303 is an example of the claimed "specific job".

4. Specific Examples

Specific examples of process results of the workflow generation process of FIG. 2 will be described while referring to FIGS. 6 to 12.

Figure 6:
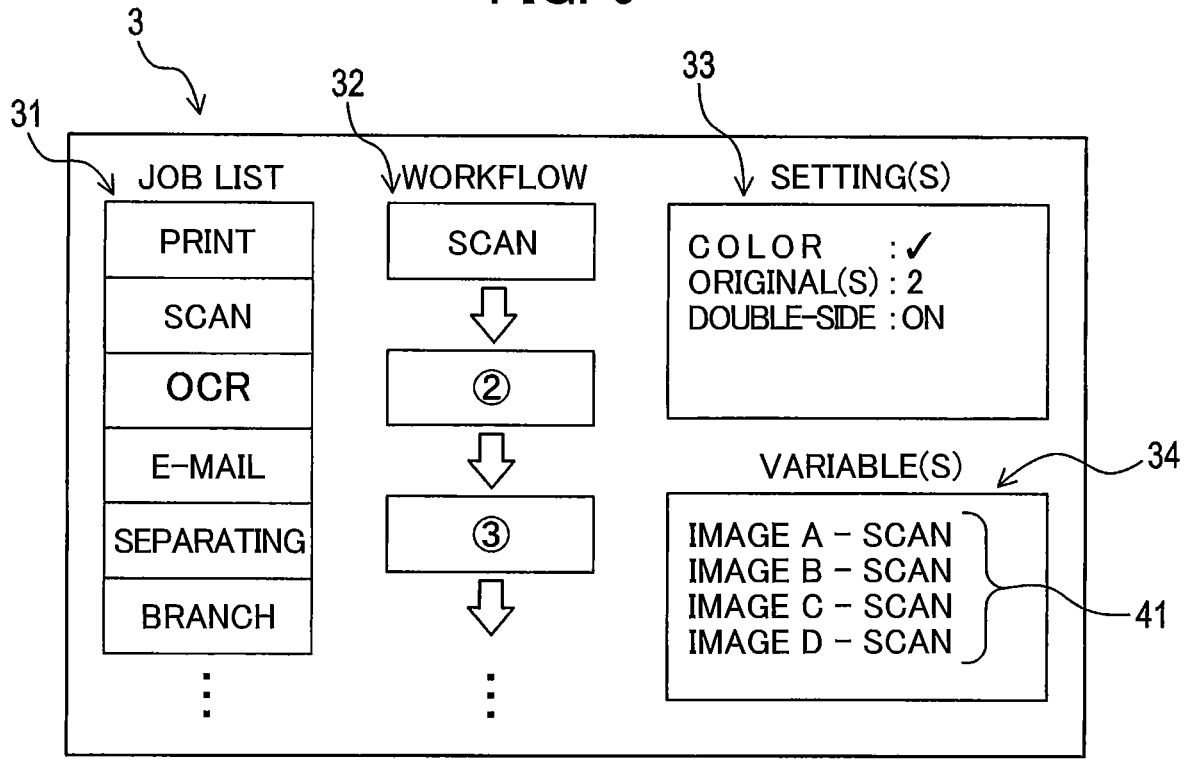
FIG. 6 is a second view illustrating the workflow generation screen displayed during the workflow generation process.

FIG. 6 illustrates a case where in S104 the scan job is selected as a job to be first executed. In this example, in S106, information for instructing to execute color scan, information indicating that the number of original documents to be scanned is two (2), and information for instructing to execute double-side scan are inputted as the essential input items, i.e., various setting items concerning the scan job. The optional input item and optional output item are not inputted.

In this case, in the output variable determination of S109, it is determined that the output variables of the scan job include four sets of image data (images A, B, C, and D). That is, the number of original documents to be scanned is two, and double-side scan is performed for each original document, so that it is determined that the four sets of image data are outputted in total.

In the addition determination process of S110, it is determined that all of the jobs displayed on the job list display part 31 can be added to the workflow. In particular, the OCR job is also determined to be addable. That is, it is determined in S201 of FIG. 3 that the OCR job has one or more essential input items and it is determined in S202 that the specific variable (image data) is included in the one or more essential input items of the OCR job. Further, since the image data is outputted by the scan job added first to the workflow, it is determined in S203 that, in the workflow, the specific type variable (image data) is outputted before execution of the OCR job. As a result, in S204, the OCR job is determined to be addable.

In S111, the setting contents (i.e., "color scan" and the like) and the output variables (i.e., "image A" and the like) are displayed on the setting display part 33 and the variable display part 34, respectively. Further, on the variable display part 34, output source information 41 is displayed near (in the present embodiment, immediately adjacent to) the output variables. The output source information 41 indicates an output source job (in this case, the scan job) from which each of the output variables (in this case, images A, B, C, and D) is outputted.

Further, since the OCR job is determined to be addable as described above, the gray-out state of the OCR job is released.

Figure 7:
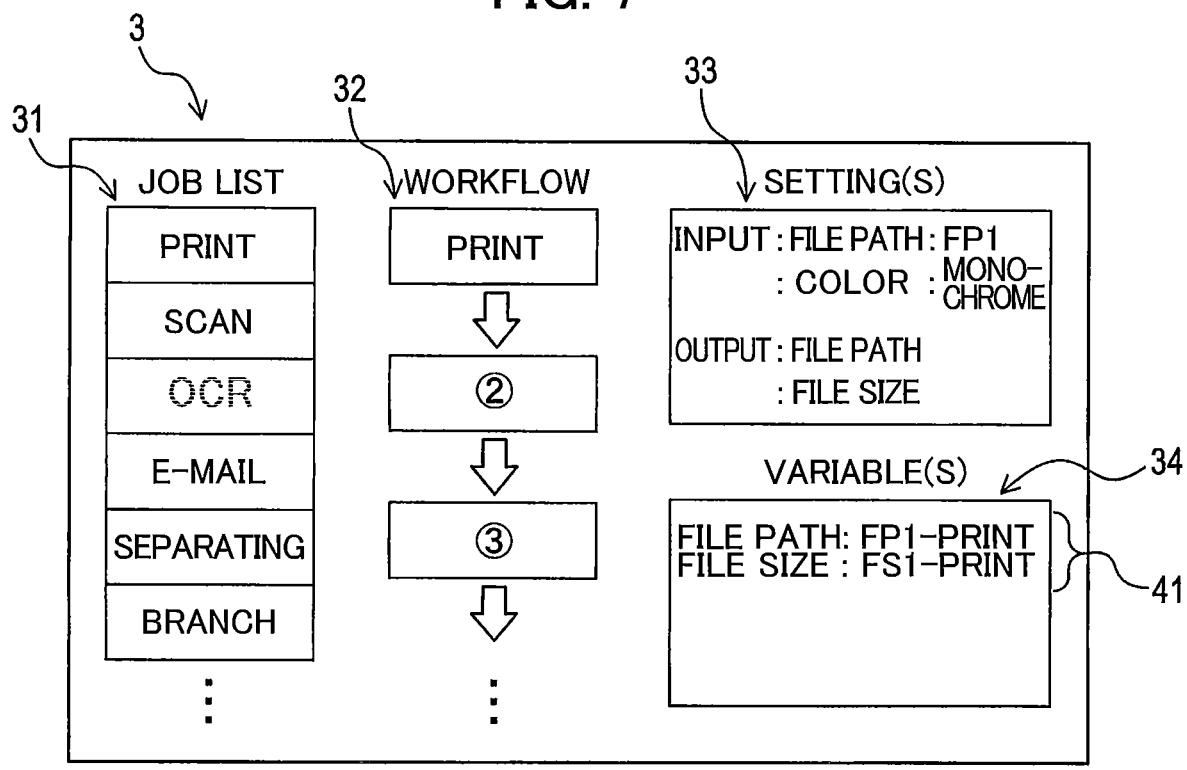
FIG. 7 is a third view illustrating the workflow generation screen displayed during the workflow generation process.

FIG. 7 illustrates a case where in S104 the print job is selected as a job to be first executed. In this example, in S106, a file path FP1 indicating the storage location of an electronic file to be printed is inputted as the essential input item. Further, in S108, information for instructing to execute monochrome print is inputted as the optional input item. Further, in S108, information for instructing to output a file path indicating the storage location of the electronic file to be printed and information for instructing to output a file size of the electronic file are inputted as the optional output items.

In this case, in the output variable determination of S109, the output variables of the print job are determined to be the file path FP1 of the storage location of the electronic file to be printed and a file size FS1 of the electronic file.

In the addition determination process of S110, it is determined that, of the jobs displayed on the job list display part 31, the jobs other than the OCR job can be added to the workflow. That is, since image data which is the essential input item of the OCR job is not outputted, it is determined in S203 that a specific type variable is not outputted. As a result, in S205, the OCR job is determined not to be addable.

In S111, the setting contents (i.e., the file path FP1 and information indicating that monochrome print is executed) are displayed on the setting display part 33. Further, on the setting display part 33, information indicating that the storage location of the electronic file to be printed is outputted and information indicating that the file size of the electronic file is outputted are displayed. Further, on the variable display part 34, the file path FP1 of the storage location, the file size FS1. Further, on the variable display part 34, information indicating the output sources (in this case, print job) of the above two variables are displayed as the output source information 41.

Note that, since the OCR job is determined not to be addable, the OCR job is displayed in a gray-out state on the job list display part 31.

Figure 8:
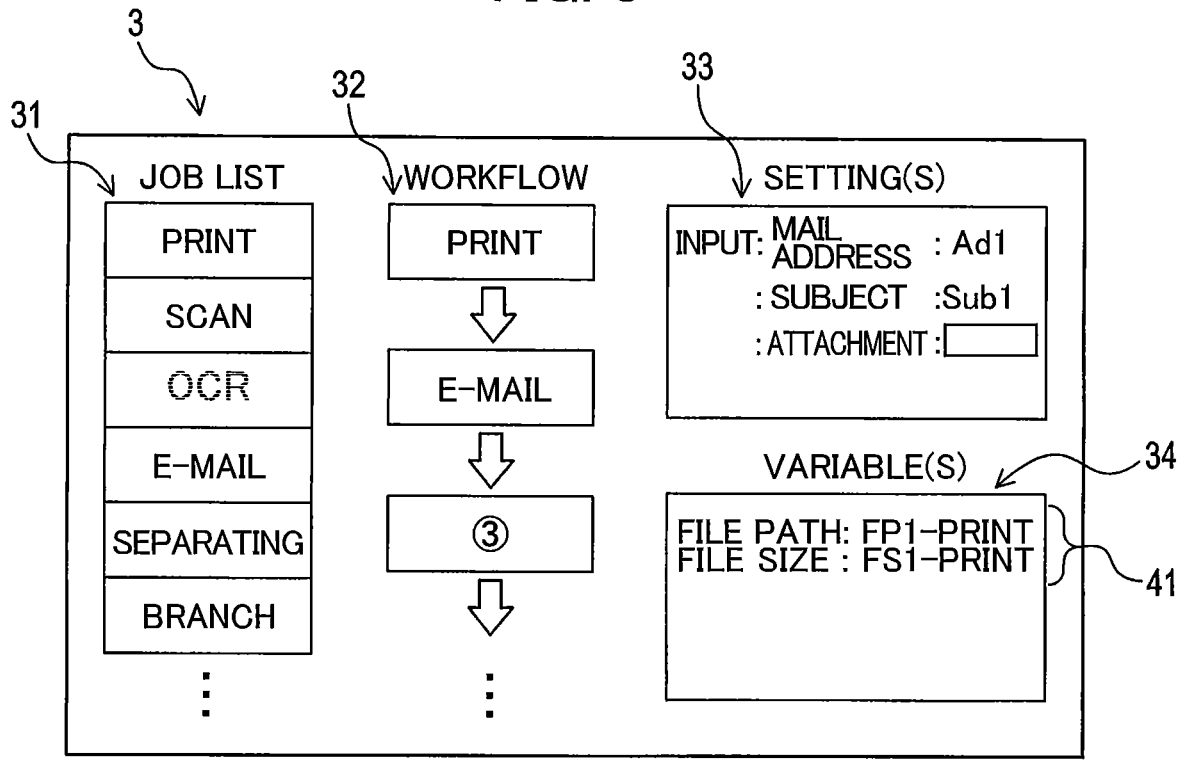
FIG. 8 is a fourth view illustrating the workflow generation screen displayed during the workflow generation process.

FIG. 8 illustrates a case where the email job is selected subsequently to the print job in the example of FIG. 7. In this example, a mail address Ad1 of an email is inputted as the essential input item of the email job in S106, and the subject Sub 1 of the email and information for instructing to attach image data to the email are inputted as the optional input items.

In this case, in the output variable determination of S109, it is determined that the email job has no output variable.

Further, in the addition determination process of S110, it is determined that the jobs other than the OCR job can be added to the workflow. The OCR job is determined not to be addable since image data which is the essential input item thereof is not outputted yet.

In S111, the setting contents of the email job are displayed on the setting display part 33. In this example, attached image data of the optional input item of the email job is inputted by the variable-use. Since attachable image data is not outputted in the print job executed before the email job, the field of the attached image data on the setting display part 33 is blank.

On the variable display part 34, only the file path FP1 and the file size FS1 which are the output variables of the print job are displayed. Since the email job has no output variable, the output variable is not newly added.

Next, a specific example of cases where the separating job is used will be described with reference to FIGS. 9 and 10.

Figure 9:
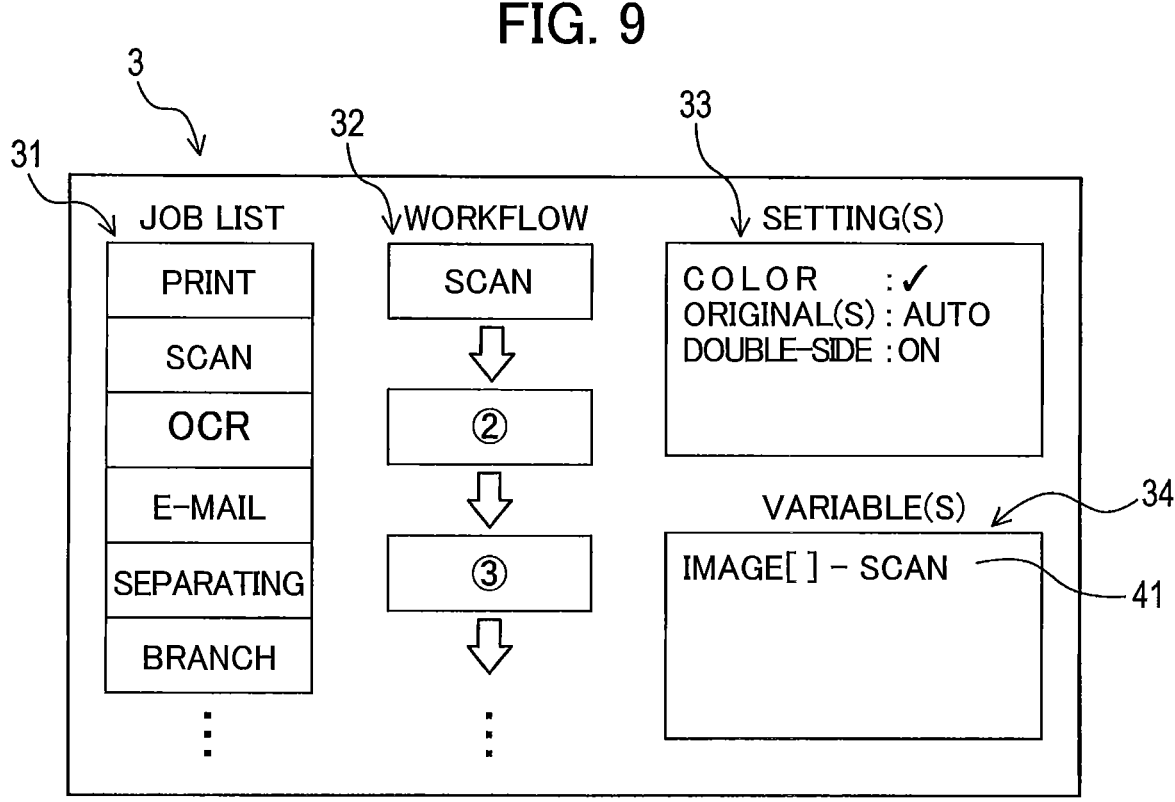
FIG. 9 is a fifth view illustrating the workflow generation screen displayed during the workflow generation process.

In the example of FIG. 9, the scan job is selected as a job to be first executed. In this example, among the essential input items, i.e., the various setting items concerning the scan, the number of original documents to be scanned is set to "automatic". Thus, the output variable of the scan job is determined to be an image [ ] which is aggregation of a plurality of sets of image data corresponding to the number of original documents to be scanned, so that the image [ ] that is the output variable of the scan job is displayed on the variable display part 34.

Figure 10:
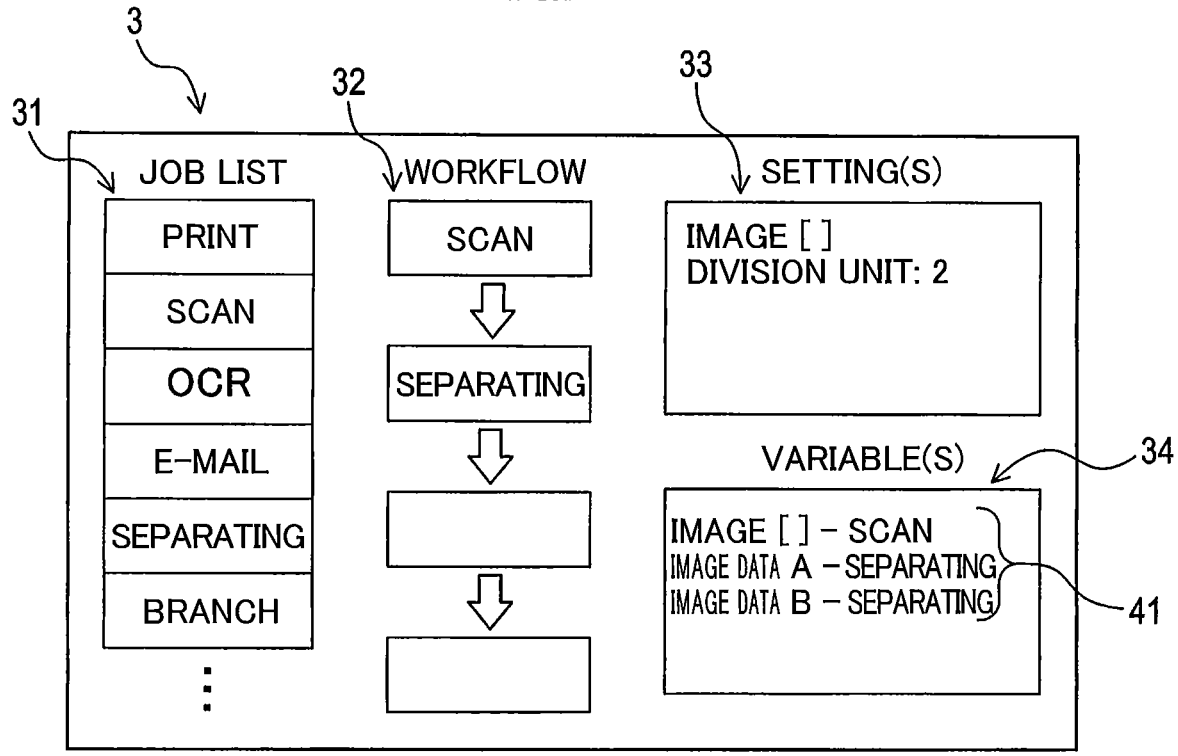
FIG. 10 is a sixth view illustrating the workflow generation screen displayed during the workflow generation process.

In this example, under the above situation, the separating job is selected in S104 of FIG. 2, as illustrated in FIG. 10. In S106, a variable to be divided and a division unit are inputted as the essential input items. The variable to be divided is the image [ ] which is the output variable of the scan job added immediately before the separating job, and the division unit is two (2).

In this case, in the output variable determination of S109, it is determined that the output variables of the separating job are two sets of image data (image data A and image data B) according to two (2) that is the division unit. More specifically, the image [ ] which is the variable to be divided is divided into a plurality of constituent elements. Each of the plurality of constituent elements consists of two pieces of image data; one is image data that is a part of the image data A, and the other is image data that is a part of the image data B. As a result, it is determined that the output variables of the separating job are the two sets of image data (i.e., the image data A and the image data B), so that the two output variables (i.e., the image data A and the image data B) are displayed on the variable display part 34 in S111.

A series of process constituted by jobs (or a job) added to the workflow after the separating job is repeatedly executed with the two pieces of image data constituting the same constituent element as a unit until the series of process is executed for all of the plurality of sets of image data stored in the image [ ]. In other words, a series of process constituted by jobs (or a job) added to the workflow after the separating job is repeatedly executed until the series of process is executed for all of the plurality of constituent elements obtained by dividing the image [ ].

Next, a specific example of cases where the branch job is used will be described with reference to FIGS. 11 and 12.

Figure 11:
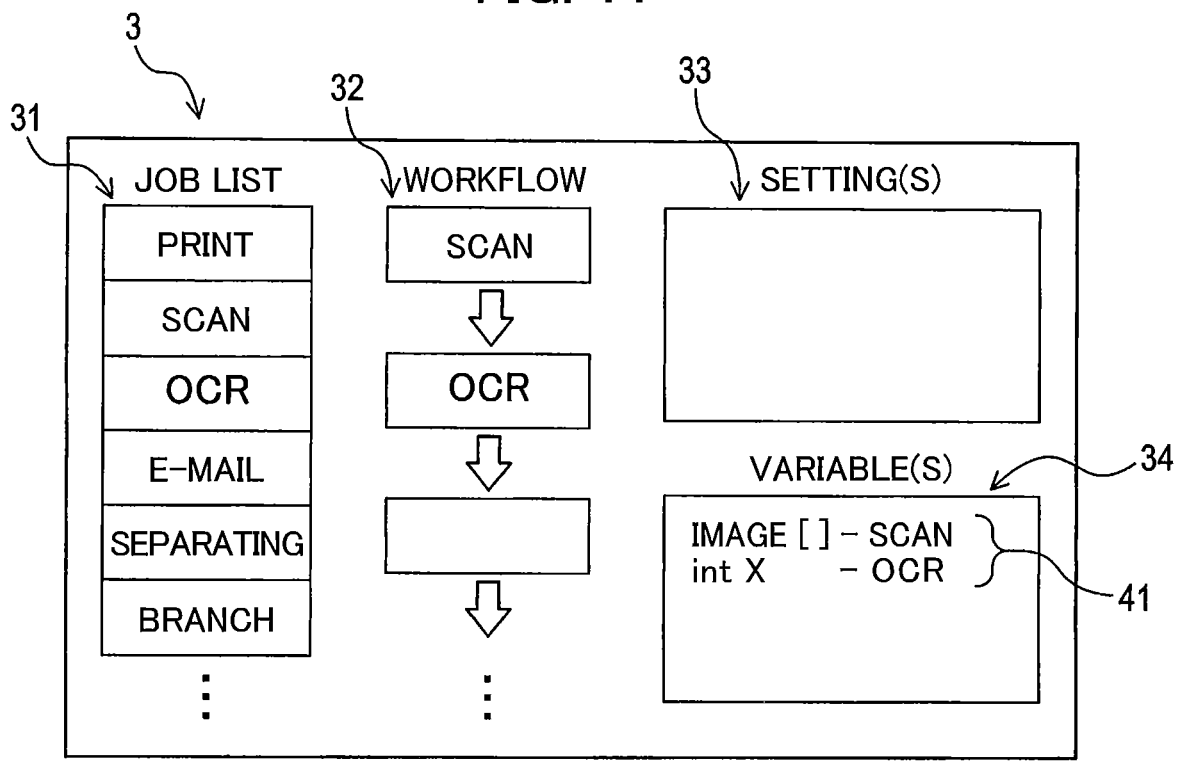
FIG. 11 is a seventh view illustrating the workflow generation screen displayed during the workflow generation process.

FIG. 11 illustrates a case where the scan job is selected first and then the OCR job is selected following the scan job. Note that, in this example, information for instructing to output a numeral included in text data obtained through conversion of image data is inputted as the optional output item of the OCR.

On the variable display part 34, an image [ ] which is the output variable of the scan job and an integer type variable intX which is the output variable of the OCR job are displayed. When a numeral is included in text data obtained through conversion of image data by the OCR job, the variable intX receives input of the numeral and outputs the same.

Figure 12:
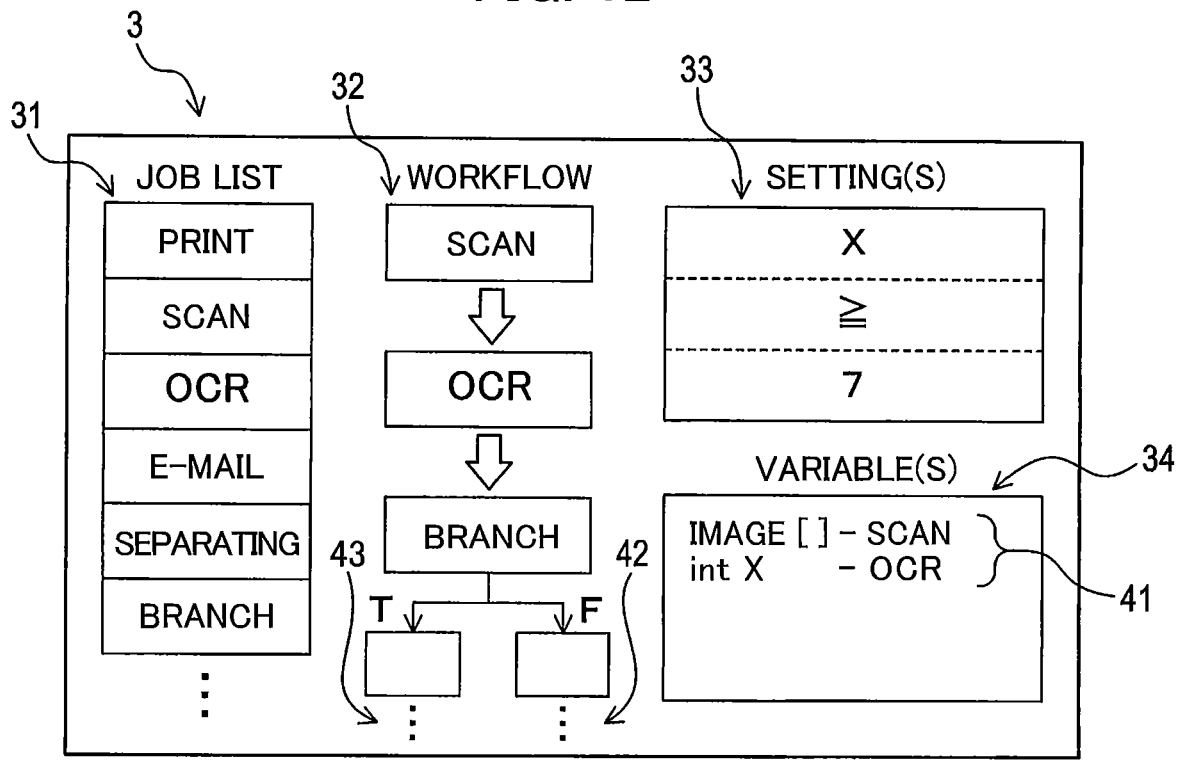
FIG. 12 is an eighth view illustrating the workflow generation screen displayed during the workflow generation process.

In this example, under the above situation, the branch job is selected in S104 as illustrated in FIG. 12. The variable intX of the OCR job, a conditional expression "≥", and a determination value "7" are inputted as the essential input items of the branch job.

As a result, a processing path constituted by a combination of a plurality of jobs is branched into two processing paths according to a condition defined by the conditional expression and the like. Specifically, when the condition "X≥7" is satisfied (see "T" in FIG. 12), the job is executed according to the branch path 43. On the other hand, when the condition "X≥7" is not satisfied (see "F" in FIG. 12), the job is executed according to the branch path 42.

5. Effects

According to the embodiment described in detail above, the following effects can be obtained.

(1) In the present embodiment, based on the job selected in S104 and input data (at least one of the type and value of an input variable) inputted in at least one of S106 and S108, the controller 22 determines the output variable of the selected job. Then, the controller 22 distinguishably displays the determined output variable on the display unit 25.

Thus, when the user intends to add a job whose essential input items include a specific variable, the user can determine, by referring to the output variable displayed on the variable display part 34, whether or not the job can be added to the workflow. That is, the user can easily determine whether or not the job whose essential input items include a specific variable can be added to the workflow.

(2) In the present embodiment, each of the plurality of jobs selectable by the user can use, as the input item thereof, the output variable of any job to be executed before the selectable job in the workflow. This can enhance the degree of freedom in generating the workflow as compared to a configuration in which each of a plurality of selectable jobs can use, as the input item thereof, the output variable of only a job to be executed immediately before the selectable job in the workflow.

Further, in the present embodiment, the output variable of each of the jobs included in the workflow is displayed on the variable display part 34. Thus, the user can easily determine whether or not a job can be added to the workflow even in a configuration like the present embodiment in which an added job can use the output variable of any job to be executed before the added job.

(3) In the present embodiment, of the plurality of jobs displayed on the job list display part 31, a job that is determined, in the addition determination process of S110, to be addable to the workflow is displayed by the controller 22 in a distinguishable manner from a job determined not to be addable.

Thus, as compared to a configuration in which a job determined to be addable and a job determined not to be addable are not distinguishably displayed on the job list display part 31, the user can easily determine addable jobs at the time of selection a job to be added.

(4) In the present embodiment, the controller 22 deletes the job selected in S112 and also deletes a job that uses as the essential input item thereof the output variable of the selected job, from among jobs to be executed after the selected job in the workflow.

When a job that uses as the essential input item thereof the output variable of a job to be deleted is left undeleted in the workflow, execution of the job left undeleted may fail during execution of the workflow due to absence of data of the essential input item. According to the present embodiment, the job that uses as the essential input item thereof the output variable of the deleted job is automatically deleted, so that user convenience can be improved.

(5) In the present embodiment, the controller 22 displays the output source information 41 on the variable display part 34 together with the output variable. This allows the user to determine which one of jobs has outputted the output variable displayed on the variable display part 34. Thus, when adding a job to the workflow, the user can recognize which one of the jobs that have already been added to the workflow outputs the output variable used as the input item of the job to be newly added. Further, when deleting a job, the user can predict which one of the output variables displayed on the variable display part 34 comes not to be outputted. Thus, as compared to a configuration in which the output source information 41 is not displayed, generation of the workflow can be facilitated.

(6) In the present embodiment, a plurality of jobs that can be selected by the user include the separating job and branch job. Thus, when repetition of the job or conditional branch is required, the repetition of the job or conditional branch can be incorporated in the workflow.

6. Other Embodiments

While the description has been made in detail with reference to the specific embodiment, it would be apparent to those skilled in the art that many modifications and variations may be made thereto.

(1) For example, in the above embodiment, each of the plurality of selectable jobs may use only output variable(s) of some of a plurality of jobs to be executed before the selectable job (for example, only output variable(s) of a job to be executed immediately before the selectable job). In this case, on the variable display part 34, only output variable(s) of a job added last to the workflow may be displayed.

(2) In the above embodiment, a job determined, by the addition determination process, not to be addable to the workflow may not be displayed on the job list display part 31.

(3) In the above embodiment, of the output variables that are displayed on the variable display part 34, output variable(s) that can be used as the input item(s) of an already added job (or a job of an addition candidate) may be displayed in a manner distinguishable from output variable(s) that cannot be used as the input item(s) of the already added job (or the job of the addition candidate). Of the output variables that are displayed on the variable display part 34; the output variable(s) that can be used as the input item(s) of the already added job (or the job of the addition candidate) is an example of the claimed "first output data" and output variable(s) that cannot be used as the input item(s) of the already added job (or the job of the addition candidate) is an example of the claimed "second output data".

Figure 13:
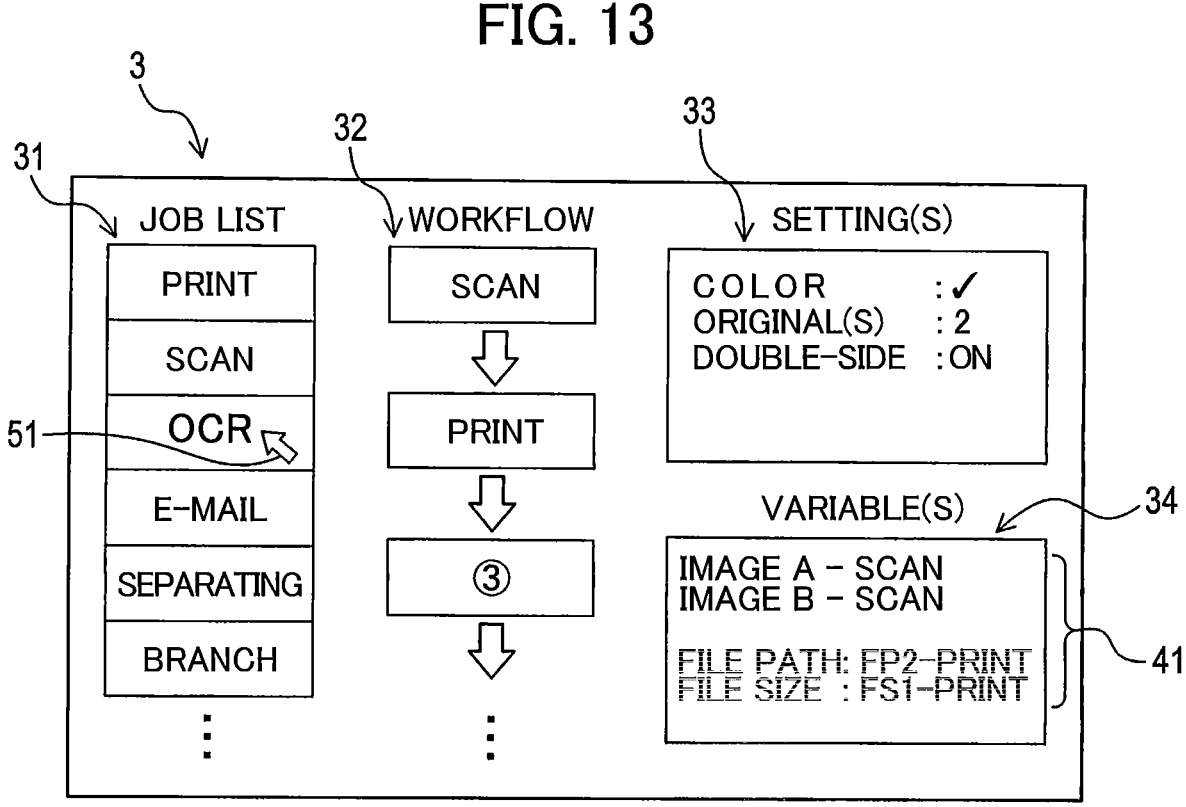
FIG. 13 is a view illustrating a workflow generation screen displayed during a workflow generation process performed by a control unit of a personal computer of a workflow generating system according to another embodiment of the present disclosure.

For example, when the OCR job is selected as the addition candidate as illustrated in FIG. 13; of the output variables displayed on the variable display part 34, the images A and B of the image data that can be used as the input item of the OCR job may be displayed distinguishably from the other output variables. In this example, the file path FP2 and the file size FS1 that cannot be used as the input item of the OCR job are displayed in a gray-out state, whereby the images A and B are displayed in a manner distinguishable from the other output variables. The reference numeral 51 of FIG. 13 denotes a cursor.

With the above configuration, the user can easily determine which one of the output variables being displayed can be used as input data for the already-added job or the job of the addition candidate. Thus, enhanced user's convenience can be obtained.

(4) In the above embodiment, the output source information 41 may not be displayed.

(5) In the above embodiment, generation of a workflow including jobs to be executed by the MFP 1 is exemplified; however, a workflow to be generated is not limited to this. The technique according to the present disclosure may be applied to generation of a workflow including jobs to be executed by an apparatus other than the MFP 1.

(6) In the above embodiment, the addition determination process is not executed when no job is added to the workflow (e.g., immediately after the start of the workflow generation process). However, the timing at which the addition determination process is executed is not limited to this. The addition determination process may be executed when no job is added to the workflow.

(7) A plurality of functions that one constituent element in the above embodiment has may be achieved by a plurality of constituent elements, or one function that one constituent element in the above embodiment possesses may be achieved by a plurality of constituent elements. Further, a plurality of functions that a plurality of constituent elements in the above embodiment have may be achieved by one constituent element, or one function achieved by a plurality of constituent elements in the above embodiment may be achieved by one constituent element.

Furthermore, a part of the configuration according to each of the above-described embodiments may be omitted. Moreover, at least a part of the configuration according to one of the above-described embodiments may be added to the configuration according to another of the above-described embodiments, or at least a part of the configuration according to one of the above-described embodiments may be substituted by at least a part of the configuration according to another of the above-described embodiments. Every aspect included in the technical concept specified by the wordings recited in the present claims is an embodiment of the present disclosure.

What is claimed is:

1. A non-transitory computer readable storage medium storing a set of program instructions for a workflow generating apparatus including a processor and a display, the workflow generating apparatus being capable of generating a workflow by combining a plurality of jobs, the set of program instructions, when executed by the processor, causing the workflow generating apparatus to perform:
   receiving a selection of one job to be added to the workflow from among a plurality of selectable jobs;
   acquiring input data to be inputted to the one job;
   specifying, on the basis of the acquired input data, output data to be outputted by execution of the one job, the output data being usable as input data for a job to be executed after execution of the one job in the workflow; and
   displaying, on the display, the specified output data in a distinguishable manner; and
   displaying first output data of a plurality of sets of output data displayed on the display in a manner distinguishable from second output data of the plurality of sets of output data displayed on the display, the first output data being output data usable as input data for a job of an addition candidate, and the second output data being output data unusable as the input data for the job of the addition candidate.

2. The non-transitory computer readable storage medium according to claim 1, wherein each of the plurality of selectable jobs is capable of using, in a case where the selectable job is added to the workflow, output data of each preceding job to be executed before execution of the selectable job in the workflow as input data of the selectable job, and
   wherein the set of program instructions, when executed by the processor, causes the workflow generating apparatus to further perform displaying output data of each job included in the workflow on the display.

3. The non-transitory computer readable storage medium according to claim 1, wherein the set of program instructions, when executed by processor, causes the workflow generating apparatus to further perform:
   determining, for each of the plurality of selectable jobs, whether the selectable job is addable to the workflow in the middle of being generated; and
   displaying at least one selectable job determined to be addable to the workflow from among the plurality of selectable jobs on the display in a distinguishable manner.

4. The non-transitory computer readable storage medium according to claim 3, wherein the determining includes:
   (a) determining whether or not essential input data for a target job includes specific input data, the target job being a job subject to the determining;
   (b) determining, in a case where the essential input data for the target job includes the specific input data, whether or not specific type output data is outputted by execution of a preceding job so as to be usable as the essential input data for the target job, the specific type output data being data having the same data type as that of the specific input data, the preceding job being a job executed before execution of the target job in the workflow when the target data is added to the workflow;
   (c) determining, in a case where the (b) determining determines that the specific type output data is outputted, that the target job is addable to the workflow; and
   (d) determining, in a case where the (b) determining determines that the specific type output data is not outputted, that the target job is not addable to the workflow.

5. The non-transitory computer readable storage medium according to claim 1, wherein the set of program instructions, when executed by processor, causes the workflow generating apparatus to further perform deleting a job selected from among at least one job included in the workflow, and
   wherein the deleting deletes a specific job from the workflow together with the selected job, the specific job being to be executed after execution of the selected job in the workflow, the specific job using, as essential input data thereof, output data of the selected job.

6. The non-transitory computer readable storage medium according to claim 1, wherein the displaying displays source information on the display together with the specified output data, the source information indicating which one of jobs included in the workflow outputs the specified output data.

7. The non-transitory computer readable storage medium according to claim 1, wherein the plurality of selectable jobs includes at least one of:
   a first job dividing output data outputted from a preceding job executed before execution of the first job into a plurality of constituent elements and executing, for each of the plurality of constituent elements, subsequent jobs to be executed after the execution of the first job in the workflow; and
   a second job causing a processing path, which is constituted by a plurality of jobs added to the workflow, to branch according to a set condition.

8. The non-transitory computer readable storage medium according to claim 1, wherein the plurality of selectable jobs includes at least one of:

a scan job executing scanning of an original document;
a print job executing printing of an electronic file; and
an OCR job executing an OCR process on image data.

9. A workflow generating apparatus capable of generating a workflow by combining a plurality of jobs, the workflow generating apparatus comprising:
- a display; and
- a processor configured to perform
    - receiving a selection of one job to be added to the workflow from among a plurality of selectable jobs,
    - acquiring input data to be inputted to the one job,
    - specifying, on the basis of the acquired input data, output data to be outputted by execution of the one job, the output data being usable as input data for a job to be executed after execution of the one job in the workflow,
    - displaying, on the display, the specified output data in a distinguishable manner, and
    - displaying first output data of a plurality of sets of output data displayed on the display in a manner distinguishable from second output data of the plurality of sets of output data displayed on the display, the first output data being output data usable as input data for a job of an addition candidate, and the second output data being output data unusable as the input data for the job of the addition candidate.

10. A method for generating a workflow by combining a plurality of jobs, the method comprising:
- providing a workflow generating apparatus including a processor and a display, the workflow generating apparatus being capable of generating a workflow by combining a plurality of jobs;
- receiving a selection of one job to be added to the workflow from among a plurality of selectable jobs;
- acquiring input data to be inputted to the one job;
- specifying, on the basis of the acquired input data, output data to be outputted by execution of the one job, the output data being usable as input data for a job to be executed after execution of the one job in the workflow;
- displaying, on the display, the specified output data in a distinguishable manner; and
- displaying first output data of a plurality of sets of output data displayed on the display in a manner distinguishable from second output data of the plurality of sets of output data displayed on the display, the first output data being output data usable as input data for a job of an addition candidate, and the second output data being output data unusable as the input data for the job of the addition candidate.

11. A non-transitory computer readable storage medium storing a set of program instructions for a workflow generating apparatus including a processor and a display, the workflow generating apparatus being capable of generating a workflow by combining a plurality of jobs, the set of program instructions, when executed by the processor, causing the workflow generating apparatus to perform:
- receiving a selection of one job to be added to the workflow from among a plurality of selectable jobs;
- acquiring input data to be inputted to the one job;
- specifying, on the basis of the acquired input data, output data to be outputted by execution of the one job, the output data being usable as input data for a job to be executed after execution of the one job in the workflow;
- displaying, on the display, the specified output data in a distinguishable manner; and
- displaying first output data of a plurality of sets of output data displayed on the display in a distinguishable manner from second output data of the plurality of sets of output data displayed on the display, the first output data being output data usable as input data for an already added job, the second output data being output data unusable as the input data for the already added job.

12. A non-transitory computer readable storage medium storing a set of program instructions for a workflow generating apparatus including a processor and a display, the workflow generating apparatus being capable of generating a workflow by combining a plurality of jobs, the set of program instructions, when executed by the processor, causing the workflow generating apparatus to perform:
- receiving a selection of one job to be added to the workflow from among a plurality of selectable jobs;
- acquiring input data to be inputted to the one job;
- specifying, on the basis of the acquired input data, output data to be outputted by execution of the one job, the output data being usable as input data for a job to be executed after execution of the one job in the workflow;
- displaying, on the display, the specified output data in a distinguishable manner; and
- deleting a job selected from among at least one job included in the workflow,
- wherein the deleting deletes a specific job from the workflow together with the selected job, the specific job being to be executed after execution of the selected job in the workflow, the specific job using, as essential input data thereof, output data of the selected job.

* * * * *

UNITED STATES PATENT AND TRADEMARK OFFICE
CERTIFICATE OF CORRECTION

PATENT NO. : 10,635,440 B2  
APPLICATION NO. : 16/144066  
DATED : April 28, 2020  
INVENTOR(S) : Kunimoto Page 1 of 1

It is certified that error appears in the above-identified patent and that said Letters Patent is hereby corrected as shown below:

In the Claims

Claim 1, Column 17, Lines 46-47:
Please change: "executed after execution of the one job in the workflow; and" to -- executed after execution of the one job in the workflow; --

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*